US010464390B2

(12) United States Patent
Sekito et al.

(10) Patent No.: US 10,464,390 B2
(45) Date of Patent: Nov. 5, 2019

(54) AIR CONDITIONING DEVICE FOR VEHICLE

(71) Applicant: DENSO CORPORATION, Kariya, Aichi-pref. (JP)

(72) Inventors: Yasuhiro Sekito, Kariya (JP); Shinya Kato, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 320 days.

(21) Appl. No.: 15/509,872

(22) PCT Filed: Sep. 22, 2015

(86) PCT No.: PCT/JP2015/004821
§ 371 (c)(1),
(2) Date: Mar. 9, 2017

(87) PCT Pub. No.: WO2016/051732
PCT Pub. Date: Apr. 7, 2016

(65) Prior Publication Data
US 2017/0305230 A1    Oct. 26, 2017

(30) Foreign Application Priority Data

Oct. 1, 2014 (JP) ................................. 2014-202821

(51) Int. Cl.
*B60H 1/00* (2006.01)

(52) U.S. Cl.
CPC ..... *B60H 1/00057* (2013.01); *B60H 1/00564* (2013.01); *B60H 1/00671* (2013.01);
(Continued)

(58) Field of Classification Search
CPC ............ B60H 1/00057; B60H 1/00857; B60H 1/00842; B60H 1/00671; B60H 1/00564; B60H 1/00692
See application file for complete search history.

(56) References Cited

U.S. PATENT DOCUMENTS 2,976,884 A * 3/1961 Kurth ...................... F16K 1/165
137/606
3,068,891 A * 12/1962 Panning ................. G05D 7/018
137/499
(Continued)

FOREIGN PATENT DOCUMENTS

| JP | S61229609 A | 10/1986 |
| JP | S63131813 U | 8/1988 |

(Continued)

*Primary Examiner* — Ljiljana V. Ciric
(74) *Attorney, Agent, or Firm* — Harness, Dickey & Pierce, P.L.C.

(57) ABSTRACT

An air conditioning device for a vehicle has an air-conditioning case, a heater core, a first air mix door, a second air mix door, and an actuator. The air-conditioning case therein has a first air passage and a second air passage. The first air mix door and the second air mix door are arranged in the first air passage and the second air passage respectively, and adjust a ratio between a flow rate of air passing through the heater core and a flow rate of air bypassing the heater core by an opening/closing operation. The actuator interlocks the opening/closing operations of the first air mix door and the second air mix door such that opening degrees of the first air mix door and the second air mix door are different from each other.

4 Claims, 13 Drawing Sheets

(52) U.S. Cl.
CPC ..... *B60H 1/00692* (2013.01); *B60H 1/00842* (2013.01); *B60H 1/00857* (2013.01)

(56) References Cited

U.S. PATENT DOCUMENTS

| | | | | |
|---|---|---|---|---|
| 3,544,045 A * | 12/1970 | Butscher | ............... | B64D 13/02 244/129.1 |
| 4,899,809 A * | 2/1990 | Takenaka | ........... | B60H 1/00842 165/202 |
| 6,092,592 A * | 7/2000 | Toyoshima | .......... | B60H 1/0005 165/204 |
| 6,192,698 B1 | 2/2001 | Kakehashi et al. | | |
| 6,270,400 B1 * | 8/2001 | Tsurushima | ....... | B60H 1/00692 454/121 |
| 6,305,462 B1 * | 10/2001 | Tsurushima | ......... | B60H 1/0005 165/103 |
| 6,347,988 B1 * | 2/2002 | Kurokawa | ......... | B60H 1/00692 454/121 |
| 6,382,305 B1 * | 5/2002 | Sano | ................... | B60H 3/0608 165/103 |
| 6,508,703 B1 * | 1/2003 | Uemura | ............. | B60H 1/00692 251/901 |
| 6,569,009 B2 * | 5/2003 | Nishikawa | ......... | B60H 1/00692 454/121 |
| 6,612,922 B2 * | 9/2003 | Uemura | ............. | B60H 1/00692 454/121 |
| 6,814,138 B2 * | 11/2004 | Tsurushima | ....... | B60H 1/00692 165/202 |
| 7,431,638 B2 * | 10/2008 | Natsume | ........... | B60H 1/00692 137/614.11 |
| 8,113,268 B2 * | 2/2012 | Stevenson | ......... | B60H 1/00692 137/625.44 |
| 8,757,245 B2 * | 6/2014 | Richter | ............. | B60H 1/00028 165/139 |
| 8,777,705 B2 * | 7/2014 | Nomura | ............. | B60H 1/00692 454/160 |
| 8,840,452 B2 * | 9/2014 | Han | ................... | B60H 1/00692 454/145 |
| 9,221,318 B2 * | 12/2015 | Uemura | ............. | B60H 1/00849 |
| 9,434,234 B2 * | 9/2016 | Suzuki | ............... | B60H 1/00692 |
| 9,636,968 B2 * | 5/2017 | Makita | .............. | B60H 1/00528 |
| 9,844,994 B2 * | 12/2017 | Byon | ................. | B60H 1/00021 |
| 9,931,908 B2 * | 4/2018 | Meehan | ............ | B60H 1/00685 |
| 10,017,027 B2 * | 7/2018 | Haraguchi | ......... | B60H 1/00064 |
| 10,076,945 B2 * | 9/2018 | Lewczynski | ....... | B60H 1/00564 |
| 10,131,199 B2 * | 11/2018 | Nakao | ................ | B60H 1/00692 |
| 2002/0084058 A1 * | 7/2002 | Ozeki | .................. | B60H 1/0005 165/42 |
| 2003/0171091 A1 * | 9/2003 | Uemura | ............. | B60H 1/00692 454/156 |
| 2005/0107027 A1 | 5/2005 | Kachi | | |
| 2005/0227606 A1 * | 10/2005 | Oide | ................... | B60H 1/00692 454/108 |
| 2006/0042778 A1 * | 3/2006 | Stevenson | .......... | B60H 1/00692 165/41 |
| 2006/0144582 A1 * | 7/2006 | Sekiya | ............... | B60H 1/00692 165/202 |
| 2007/0077879 A1 * | 4/2007 | Marshall | ............ | B60H 1/00685 454/121 |
| 2007/0184774 A1 * | 8/2007 | Balzo | ................. | B60H 1/00671 454/143 |
| 2008/0257085 A1 | 10/2008 | Bless et al. | | |
| 2013/0008627 A1 | 1/2013 | Uemura | | |
| 2015/0107815 A1 | 4/2015 | Hhraguchi et al. | | |

FOREIGN PATENT DOCUMENTS

| | | |
|---|---|---|
| JP | H09240247 A | 9/1997 |
| JP | 2000085338 A | 3/2000 |
| JP | 2000168336 A | 6/2000 |
| JP | 2005145190 A | 6/2005 |
| JP | 2010253973 A | 11/2010 |
| JP | 2013014284 A | 1/2013 |
| JP | 2013040687 A | 2/2013 |
| JP | 2013133068 A | 7/2013 |
| JP | 2014061789 A | 4/2014 |

* cited by examiner

AIR FLOW DIRECTION

AIR CONDITIONING DEVICE FOR VEHICLE

CROSS REFERENCE TO RELATED APPLICATIONS

This application is a U.S. National Phase Application under 35 U.S.C. 371 of International Application No. PCT/JP2015/004821 filed on Sep. 22, 2015 and published in Japanese as WO 2016/051732 A1 on Apr 7, 2016. This application is based on and claims the benefit of priority from Japanese Patent Application No. 2014-202821 filed on Oct. 1, 2014. The entire disclosures of all of the above applications are incorporated herein by reference.

TECHNICAL FIELD

The present disclosure relates to an air conditioning device, having two air passages in an air conditioning case, for a vehicle.

BACKGROUND ART

An example of an air conditioning device for a vehicle of this type includes an air conditioning device for a vehicle described in Patent Literature 1. The air conditioning device for a vehicle described in Patent Literature 1 includes an air-conditioning case that has an air passage. In the air-conditioning case, a blower, an evaporator, and a heater core are disposed in this order from the upstream side. The air passage in the air-conditioning case is divided into a first air passage and a second air passage by a partition plate. The first air passage and the second air passage blow air introduced through the blower, into the vehicle interior.

The air conditioning device for a vehicle includes a first air mix door disposed in the first air passage, and a second air mix door disposed in the second air passage. In the first air passage, the first air mix door adjusts the flow rate of air passing through the heater core and the flow rate of air bypassing the heater core. In the second air passage, the second air mix door adjusts the flow rate of air passing through the heater core and the flow rate of air bypassing the heater core. The air conditioning device for a vehicle adjusts the temperature of air blown into the vehicle interior by changing the opening degrees of the first air mix door and the second air mix door.

PRIOR ART LITERATURES

Patent Literature

Patent Literature 1: JP H9-240247 A

SUMMARY OF INVENTION

In the air conditioning device for a vehicle described in Patent Literature 1, the opening degrees of the two air mix doors are set to the same degree. Therefore, the temperature of air supplied into the vehicle interior from the first air passage and the temperature of air supplied into the vehicle interior from the second air passage have almost the same value. When the value of the former and the value of the latter are made different, air of different temperatures can be supplied into the vehicle interior, making it possible to provide a more comfortable space in the vehicle.

The present disclosure has been made in view of the foregoing. The object of the present disclosure is to provide an air conditioning device for a vehicle that can make a temperature difference between air supplied into a vehicle interior through a first air passage and air supplied into the vehicle interior through a second air passage.

An air conditioning device for a vehicle according to the present disclosure has an air-conditioning case, a heater core, a first air mix door, a second air mix door, and an actuator. The air-conditioning case therein has a first air passage and a second air passage. The heater core heats air flowing through each of the first air passage and the second air passage. The first air mix door is arranged in the first air passage and adjusts a ratio between a flow rate of air passing through the heater core and a flow rate of air bypassing the heater core by an opening/closing operation. The second air mix door is arranged in the second air passage and adjusts a ratio between a flow rate of air passing through the heater core and a flow rate of air bypassing the heater core in the second air passage by an opening/closing operation. The actuator interlocks the opening/closing operations of the first air mix door and the second air mix door such that opening degrees of the first air mix door and the second air mix door are different from each other.

According to the present disclosure, the opening degrees of the first air mix door and the second air mix door are different from each other. Therefore, it is possible to make a temperature difference between air supplied into a vehicle interior through the first air passage and air supplied into the vehicle interior through the second air passage.

BRIEF DESCRIPTION OF DRAWINGS

The above and other objects, features and advantages of the present disclosure will become more apparent from the following detailed description made with reference to the accompanying drawings.

DESCRIPTION OF EMBODIMENTS

An embodiment of an air conditioning device for a vehicle will be described below. First, an outline of the air conditioning device for a vehicle of the present embodiment will be described.

Figure 1:
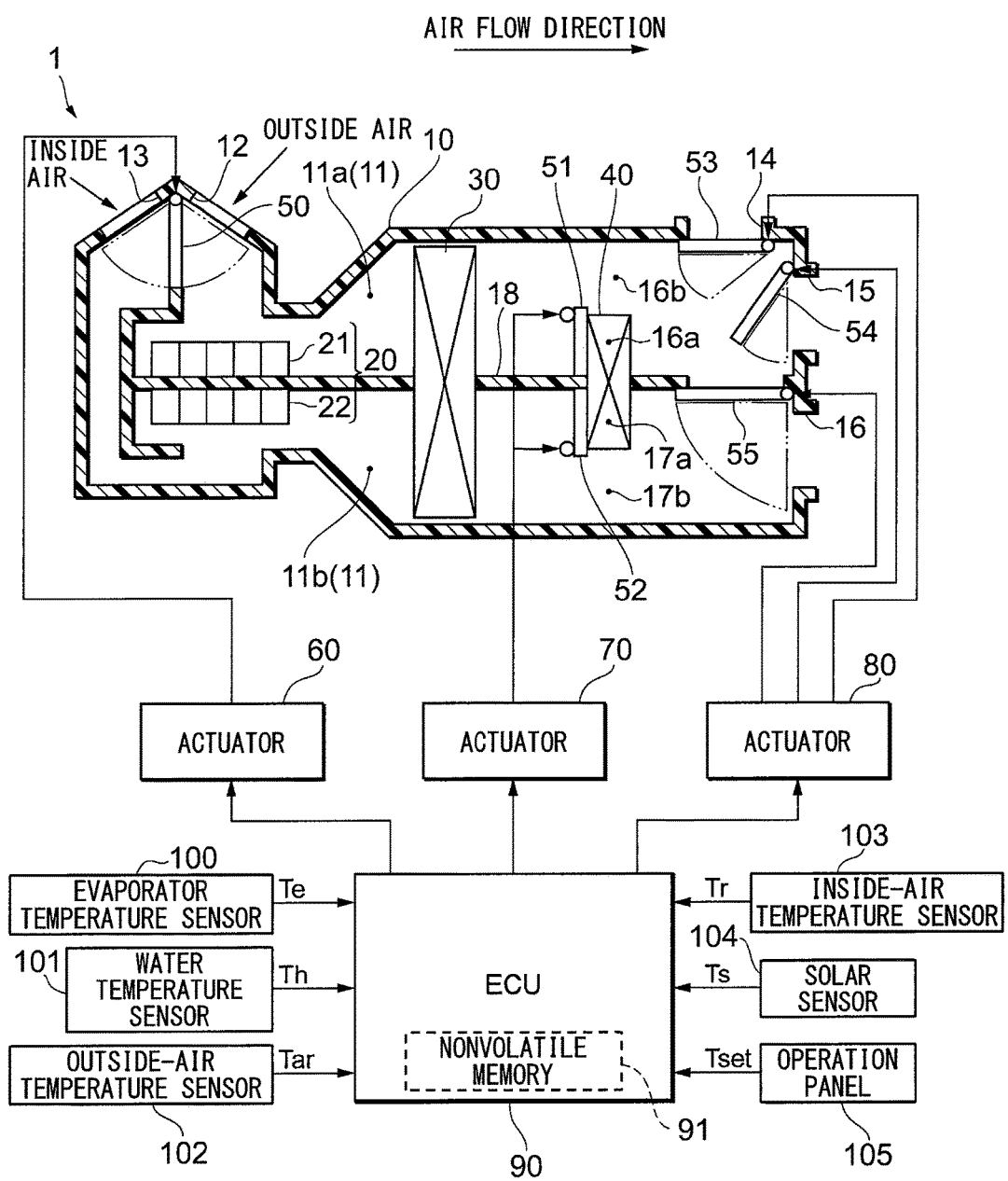
FIG. 1 is a schematic view illustrating a configuration of an air conditioning device for a vehicle according to an embodiment.

As illustrated in FIG. 1, the air conditioning device 1 for a vehicle in the present embodiment includes an air-conditioning case 10, a blower 20, an evaporator 30, and a heater core 40.

The air-conditioning case 10 has an air passage 11 serving as an air passage for blowing air. In the air passage 11, the blower 20, the evaporator 30, and the heater core 40 are arranged in this order from the upstream side. The air passage 11 is divided into a first air passage 11a and a second air passage 11b by a partition plate 18 provided in the air-conditioning case 10.

The air-conditioning case 10 has an outside-air introduction port 12 and an inside-air introduction port 13 in an exterior wall on an upstream side. The outside-air introduction port 12 takes air (i.e., outside air) outside a vehicle interior into the air passage 11. The inside-air introduction port 13 takes air (i.e., inside air) inside the vehicle interior into the air passage 11. The outside-air introduction port 12 is located upstream of the first air passage 11a. The inside-air introduction port 13 is located upstream of the second air passage 11b.

The air-conditioning case 10 has a defroster outlet 14, a face outlet 15, and a foot outlet 16 in an exterior wall on a downstream side. The defroster outlet 14 blows air from the air passage 11 toward the internal surface portion of the windshield of the vehicle. The face outlet 15 blows air from the air passage 11 toward the head and chest of a driver and the head and chest of a passenger seated on a front passenger seat of the vehicle. The defroster outlet 14 and the face outlet 15 are located downstream of the first air passage 11a. The foot outlet 16 blows air from the air passage 11 toward a foot of the driver and a foot of the passenger seated on the front passenger seat of the vehicle. The foot outlet 16 is located downstream of the second air passage 11b.

The blower 20 has a first blower 21 disposed on the upstream side of the first air passage 11a, and a second blower 22 disposed on the upstream side of the second air passage 11b. The first blower 21 blows outside air taken in from the outside-air introduction port 12 or inside air taken in from the inside-air introduction port 13 to the first air passage 11a. The second blower 22 blows outside air taken in from the outside-air introduction port 12 or inside air taken in from the inside-air introduction port 13 to the second air passage 11b.

The evaporator 30 penetrates the partition plate 18 to block the entire cross section of the first air passage 11a and the entire cross section of the second air passage 11b in a direction perpendicular to an air flow direction. As is well known, the evaporator 30 is a cooling heat exchanger that cools and dehumidifies air in a manner that low-pressure refrigerant in a refrigeration cycle absorbs the heat from the air and evaporates moisture from the air. The evaporator 30 cools and dehumidifies air blown from each of the first blower 21 and the second blower 22 and blows the air to the heater core 40 located on the downstream.

The heater core 40 penetrates the partition plate 18 to block a part of the cross section of the first air passage 11a and a part of the cross section of the second air passage 11b in a direction perpendicular to the air flow direction. In the first air passage 11a, a portion where the heater core 40 is disposed configures a heating passage 16a, and a portion where the heater core 40 is not disposed configures a bypass passage 16b. Similarly, in the second air passage 11b, a portion where the heater core 40 is disposed configures a heating passage 17a, and a portion where the heater core 40 is not disposed configures a bypass passage 17b. In the heater core 40, cooling water is flowing, which has increased in temperature as a result of cooling an in-vehicle engine. The heater core 40 is a heating heat exchanger that heats air using the cooling water as a heat source for heating. The heater core 40 heats air cooled and dehumidified by the evaporator 30, and blows the air to the downstream side. Thus, in the first air passage 11a, air heated by passing through the heating passage 16a and air cooled by passing through the bypass passage 16b are mixed, so that the temperature of the air is adjusted. Similarly, also in the second air passage 11b, air heated by passing through the heating passage 17a and air cooled by passing through the bypass passage 17b are mixed, so that the temperature of the air is adjusted.

The air conditioning device 1 for a vehicle has an inside/outside air switching door 50, a first air mix door 51, a second air mix door 52, a defroster door 53, a face door 54, and a foot door 55, in the air-conditioning case 10.

The inside/outside air switching door 50 opens one of the outside-air introduction port 12 and the inside-air introduction port 13, and closes the other, thereby introducing either outside air or inside air into the first air passage 11a and the second air passage 11b. Moreover, the inside/outside air switching door 50 opens both the outside-air introduction port 12 and the inside-air introduction port 13, thereby introducing outside air into the first air passage 11a, and inside air into the second air passage 11b.

The first air mix door 51 is disposed between the evaporator 30 and the heater core 40 in the first air passage 11a. The second air mix door 52 is disposed between the evaporator 30 and the heater core 40 in the second air passage 11b.

Figure 2:
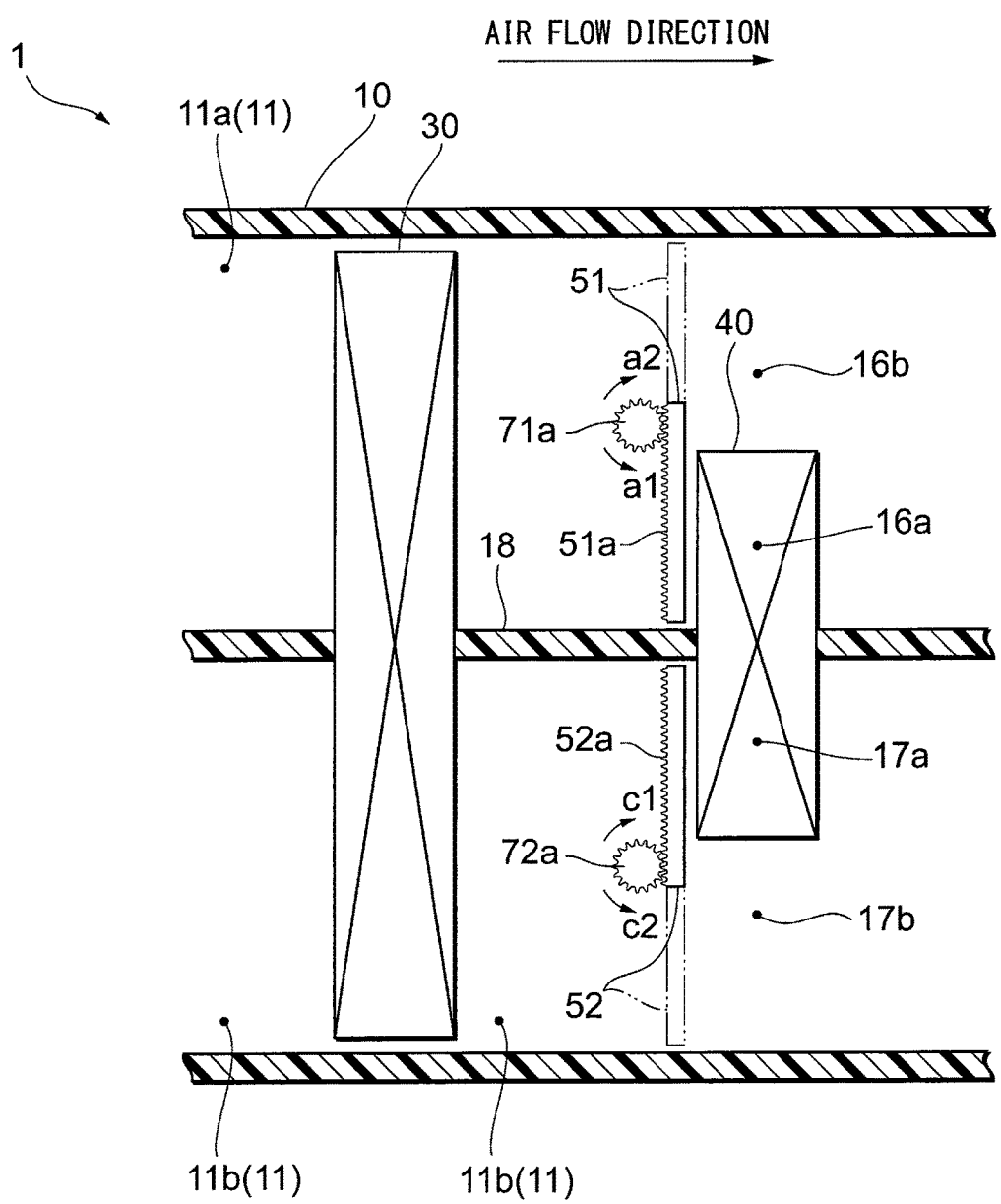
FIG. 2 is sectional view illustrating a structure around a first air mix door and a second air mix door of the air conditioning device for a vehicle according to the embodiment.

As illustrated in FIG. 2, each of the first air mix door 51 and the second air mix door 52 is configured by a plate member and is disposed such that a direction parallel to the air flow direction coincides with a thickness direction of the plate member. The first air mix door 51 has a linear gear portion 51a on an upstream side surface. The second air mix door 52 also has a linear gear portion 52a on an upstream side surface. Each of the first air mix door 51 and the second air mix door 52 is supported by a support structure, not illustrated, to be slidable in a direction perpendicular to the air flow direction. Specifically, each of the first air mix door 51 and the second air mix door 52 is slidable between the position indicated by the solid line and the position indicated by two-dot chain line in FIG. 2. The position indicated by the solid line is the maximum cooling position (MAX-COOL), where the heating passages 16a and 17a are fully closed while the bypass passages 16b and 17b are fully opened. On the other hand, the position indicated by the two-dot chain line is the maximum heating position (MAX-HOT), where the heating passages 16a and 17a are fully opened while the bypass passages 16b and 17b are fully closed. In descriptions below, for the sake of convenience, a condition in which the first air mix door 51 is located in the position indicated by the solid line in FIG. 2 is referred to as a fully closed condition, and a condition in which the first air mixing-door 51 is located in the position indicated by the two-dot chain line in FIG. 2 is referred to as a fully open condition. The conditions are similarly defined regarding the second air mix door 52 as well.

The first air mix door 51 adjusts a ratio between the flow rate of air passing through the heating passage 16a and the flow rate of air passing through the bypass passage 16b according to the opening degree of the door 51. That is, the temperature of air in the first air passage 11a is adjusted depending on the opening degree of the first air mix door 51. For example, when the first air mix door 51 is fully closed, most of the air in the first air passage 11a flows by way of bypass around the heater core 40 and, therefore, the temperature of air in the first air passage 11a becomes the lowest. On the other hand, when the first air mix door 51 is fully open, most of the air in the first air passage 11a passes through the heater core 40 and, therefore, the temperature of air in the first air passage 11a becomes the highest.

The second air mix door 52 adjusts a ratio between the flow rate of air passing through the heating passage 17a and the flow rate of air passing through the bypass passage 17b, depending on the opening degree of the door 52. That is, the temperature of air in the second air passage 11b is adjusted depending on the opening degree of the second air mix door 52.

As illustrated in FIG. 1, the defroster door 53 opens or closes the defroster outlet 14. The face door 54 opens or closes the face outlet 15. The foot door 55 opens or closes the foot outlet 16.

In the air conditioning device 1 for a vehicle, for example, as illustrated in the drawing, when the inside/outside air switching door 50 opens both the outside-air introduction port 12 and the inside-air introduction port 13, outside air flows into the first air passage 11a, and inside air flows into the second air passage 11b. Therefore, outside air can be blown from the defroster door 53 or the face outlet 15, and inside air can be blown from the foot outlet 16. Thus, by supplying air to the vehicle interior in a manner, a two-layer inside/outside air flow can be achieved such that outside air is circulated in the upper layer of the vehicle interior and inside air is circulated in the lower layer of the vehicle interior.

Electrical configuration of the air conditioning device 1 for a vehicle will be described below.

As illustrated in FIG. 1, the air conditioning device 1 for a vehicle includes actuators 60, 70, and 80. The actuator 60 opens or closes the inside/outside air switching door 50. The actuator 70 opens or closes the first air mix door 51 and the second air mix door 52. The actuator 80 drives and opens or closes the defroster door 53, the face door 54, and the foot door 55.

The air conditioning device 1 for a vehicle includes an electronic control unit (ECU) 90 that controls drive of each of the actuators 60, 70, 80. In addition, the air conditioning device 1 for a vehicle includes an evaporator temperature sensor 100, a water temperature sensor 101, an outside-air temperature sensor 102, an inside-air temperature sensor 103, a solar sensor 104, and an operation panel 105.

The evaporator temperature sensor 100 detects the evaporator temperature Te indicating the temperature of air that has passed through the evaporator 30. The water temperature sensor 101 detects the temperature of engine cooling water flowing into the heater core 40, i.e., a heater core temperature Th indicating the temperature of the heater core 40. The outside-air temperature sensor 102 detects the outside-air temperature Tam indicating the temperature outside the vehicle interior. The inside-air temperature sensor 103 detects the inside-air temperature Tr indicating the temperature of the vehicle interior. The solar sensor 104 detects an amount of insolation Ts. Detection signals from the sensors 100-104 are taken into the ECU 90.

The operation panel 105 is capable of setting a temperature, a volume of air, a blowing outlet etc. when an occupant operates the operation panel 105. The operation panel 105 outputs setting signals to an ECU 90 depending on set values for the set temperature, the volume of air, the blowing outlet, etc.

The ECU 90 is configured mainly by a microcomputer and includes a nonvolatile memory 91, and so on. The ECU 90 controls operations of the actuators 60, 70, 80, based on the detection signals from the sensors 100 to 104 and a set signal from the operation panel 105.

Next, the structure of the actuator 70 will be described in detail.

Figure 3:
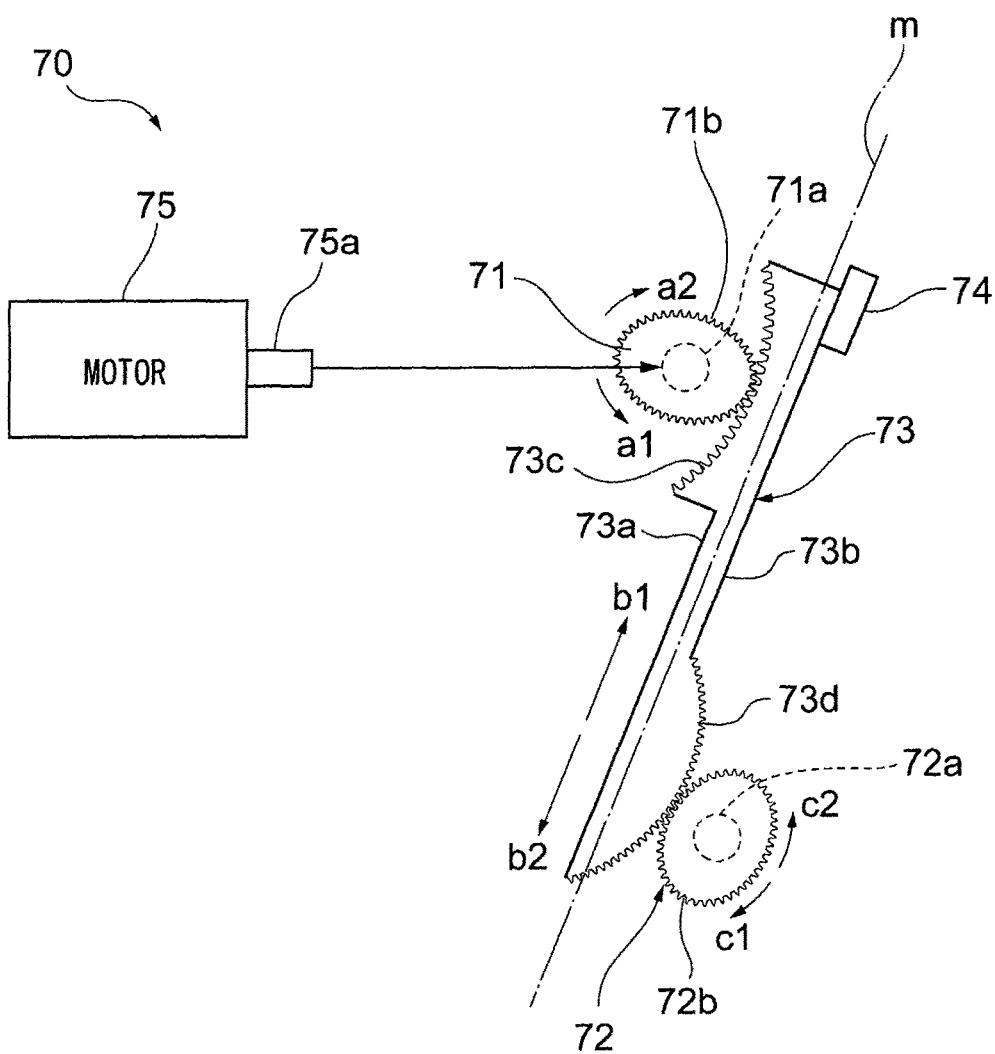
FIG. 3 is a front view illustrating a configuration of an actuator of the air conditioning device for a vehicle according to the embodiment.

As illustrated in FIG. 3, the actuator 70 has a first gear 71, a second gear 72, a rack gear 73, a guide member 74, and a motor 75

The first gear 71 has an external gear. The first gear 71 has a circular gear portion 71a, which has a circular shape in a cross-section perpendicular to the axial direction of the gear 71, and a non-circular gear portion 71b, which has an elliptical shape in a cross-section perpendicular to the axial direction. The circular gear portion 71a and the non-circular gear portion 71b are staggered in the axial direction. In FIG. 3, the gear teeth of the circular gear portion 71a are omitted. Hereinafter, illustration of the gear teeth of the circular gear portion 71a is omitted if unnecessary. As illustrated in FIG. 2, the circular gear portion 71a is engaged with the gear portion 51a of the first air mix door 51. As illustrated in FIG. 3, the non-circular gear portion 71b is engaged with the rack gear 73. As illustrated in FIG. 2, when the first air mix door 51 is fully closed, the long-diameter-portion of the non-circular gear portion 71b is, as illustrated in FIG. 3, engaged with the rack gear 73. The first gear 71 corresponds to a first rotation member that opens or closes the first air mix door 51, based on a rotating operation.

The second gear 72 and the first gear 71 have the same shape. That is, the second gear 72 also has an external gear. The second gear 72 has a circular gear portion 72a, which has a circular shape in a cross-section perpendicular to the axial direction of the gear 72, and a non-circular gear portion 72b, which has an elliptical shape in a cross-section perpendicular to the axial direction. The circular gear portion 72a and the non-circular gear portion 72b are staggered in the axial direction. In FIG. 3, the gear teeth of the circular gear portion 72a are omitted. Hereinafter, illustration of the gear teeth of the circular gear portion 72a is omitted if unnecessary. As illustrated in FIG. 2, the circular gear portion 72a is engaged with the gear portion 52a of the second air mix door 52. As illustrated in FIG. 3, the non-circular gear portion 72b is engaged with the rack gear 73. As illustrated in FIG. 2, when the second air mix door 52 is fully closed, the short-diameter-portion of the non-circular gear portion 72b is, as illustrated in FIG. 3, engaged with the rack gear 73. The second gear 72 corresponds to a second rotation member that opens or closes the second air mix door 52, based on a rotating operation.

The rack gear 73 extends linearly along an axial line m. The rack gear 73 is disposed such that the first gear 71 faces one side surface 73a of the rack gear 73, and the second gear 72 faces the other side surface 73b. The rack gear 73 has a first gear surface 73c, which has a recessed shape, in a portion of the one side surface 73a facing the non-circular gear portion 71b of the first gear 71. Gear teeth are arranged in the first gear surface 73c to have a curved recessed shape to be kept engaged with the non-circular gear portion 71b of the first gear 71 when the rack gear 73 moves in direction along the axial line m. The rack gear 73 further has a second gear surface 73d, which has a protruding shape, in a portion of the other side surface 73b facing the second gear 72. Gear teeth are arranged in the second gear surface 73d to have a curved protruding shape to be kept engaged with the non-circular gear portion 72b of the second gear 72 when the rack gear 73 moves in direction along the axial line m. By connecting the first gear 71 and the second gear 72, the rack gear 73 interlocks opening/closing operations of the first air mix door 51 and the second air mix door 52.

The guide member 74 is disposed to be in contact with a portion on the opposite side of the first gear surface 73c on the other side surface 73b of the rack gear 73. When the rack gear 73 moves in direction along the axial line m, the guide member 74 guides movement of the rack gear 73 such that the first gear 71 and the second gear 72 can be kept engaged with the rack gear 73.

An output shaft 75a of the motor 75 is connected to the rotation shaft of the first gear 71. That is, the motor 75 rotates the first gear 71. The first air mix door 51 slides to perform an opening/closing operation in conjunction with the rotation of the first gear 71. In addition, according to rotation of the first gear 71, the rack gear 73 moves in a direction along the axial line m, so that the second gear 72 also rotates. The second air mix door 52 slides to perform an opening/closing operation in conjunction with the rotation of the second gear 72.

Figure 4A:
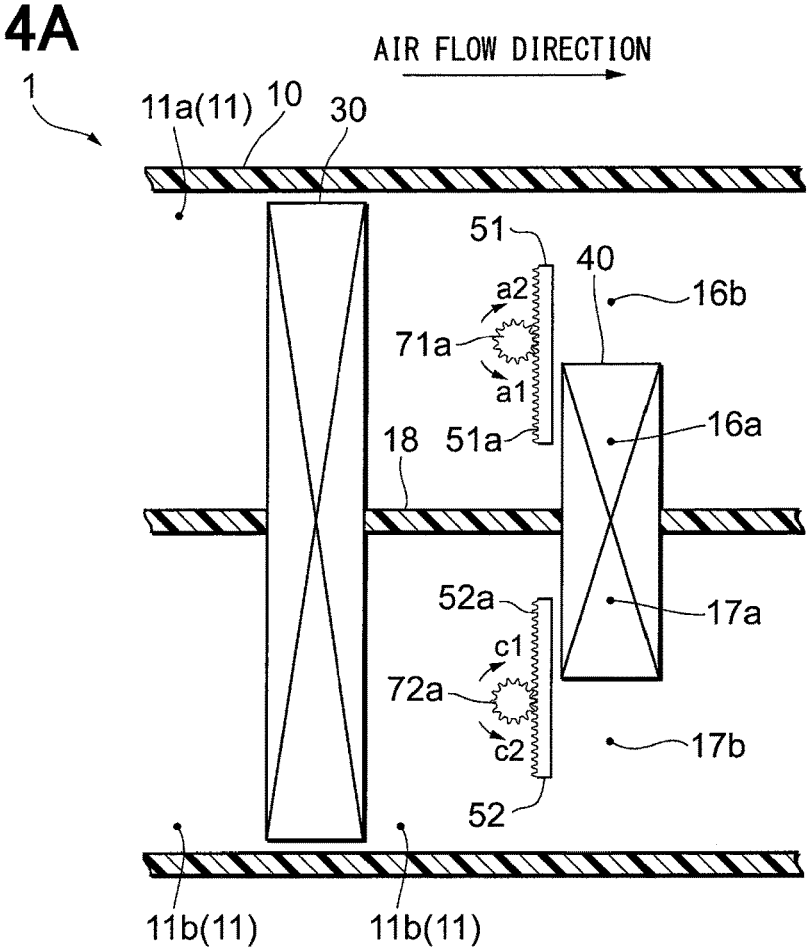
FIG. 4A is a sectional view illustrating an example of operations of the first air mix door and the second air mix door illustrated in FIG. 2.
Figure 4B:
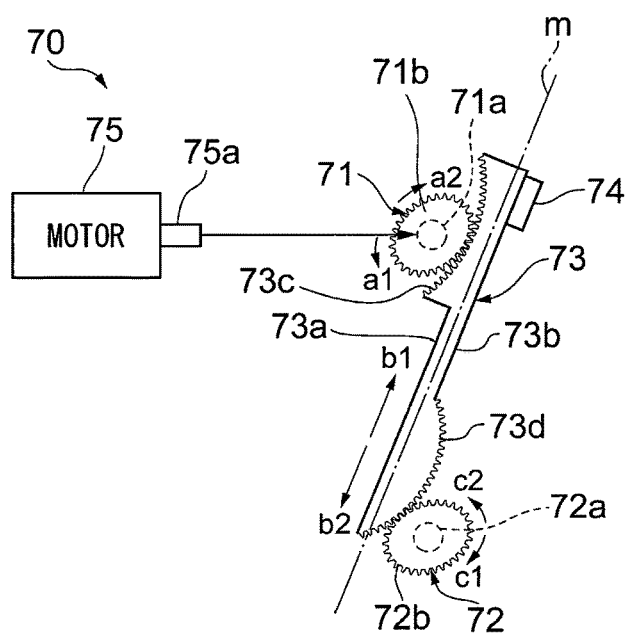
FIG. 4B is a front view illustrating an example of an operation of the actuator illustrated in FIG. 3.

Specifically, as illustrated in FIG. 2, when the first air mix door 51 is fully closed, the second air mix door 52 is also fully closed. If the motor 75 rotates the first gear 71 in the direction indicated by the arrow a1 in this state, the first air mix door 51 moves in the direction in which the first air mix door 51 opens, as illustrated in FIG. 4A. In other words, the opening degree of the first air mix door 51 changes in the direction in which the first air mix door opens. At this time, as illustrated in FIG. 4B, when the rack gear 73 moves in the direction of the arrow b1 in conjunction with a rotation of the first gear 71, the second gear 72 rotates in the direction of the arrow c1. The second air mix door 52 also moves in the direction in which the second air mix door opens as illustrated in FIG. 4A, in conjunction with the rotation of the second gear 72.

Figure 5A:
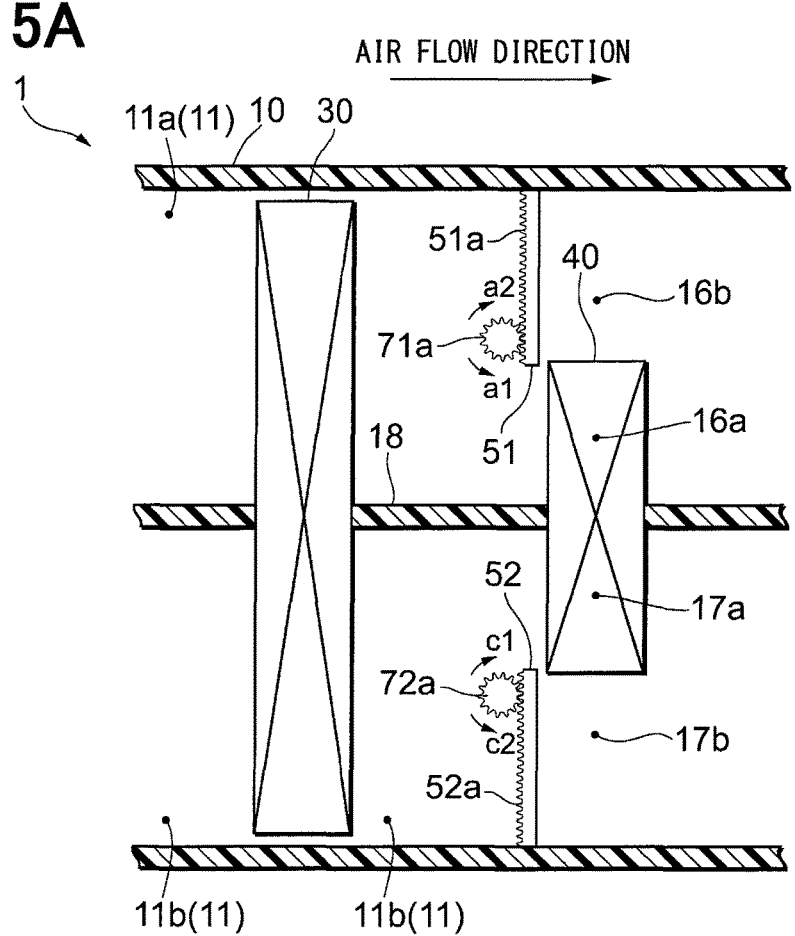
FIG. 5A is a sectional view illustrating example of operations of the first air mix door and the second air mix door illustrated in FIG. 2.
Figure 5B:
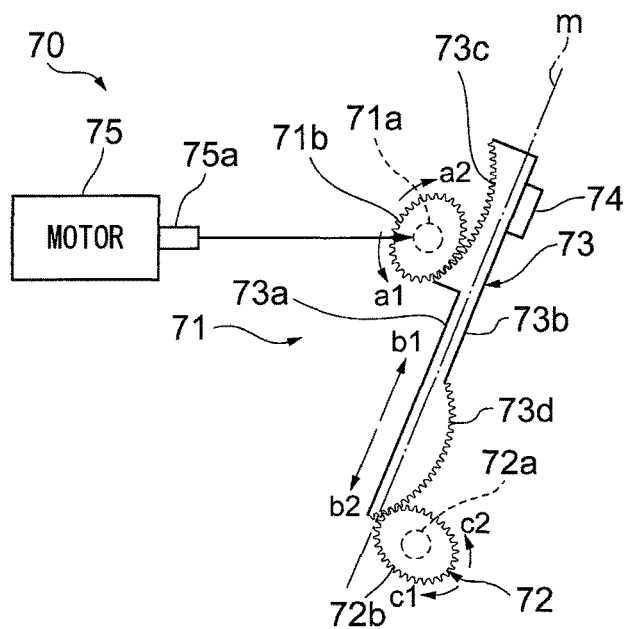
FIG. 5B is a front view illustrating an example of an operation of the actuator illustrated in FIG. 3.

When the motor 75 further rotates the first gear 71 in the direction of the arrow a1, the first air mix door 51 fully opens, as illustrated in FIG. 5A. At this time, as illustrated in FIG. 5B, when the rack gear 73 further moves in the direction of the arrow b1 in conjunction with a rotation of the first gear 71, the second gear 72 further rotates in the direction of the arrow c1. The second air mix door 52 also fully opens as illustrated in FIG. 5A, in conjunction with the rotation of the second gear 72.

Conversely, when the motor 75 rotates the first gear 71 in the direction of the arrow a2 opposite to the direction of the arrow a1, with the first air mix door 51 and the second air mix door 52 being in the respective conditions illustrated in FIG. 5A, the first air mix door 51 moves in the direction in which the first air mix door closes. At this time, when the rack gear 73 moves in the direction of the arrow b2 opposite to the direction of the arrow b1, the second gear 72 rotates in the direction of the arrow c2 opposite to the arrow c1. The second air mix door 52 also moves in the direction in which the second air mix door closes in conjunction with the rotation of the second gear 72.

In this way, the first air mix door 51 and the second air mix door 52 perform opening/closing operations while being interlocked on the basis of drive of the motor 75.

Next, control for the opening degrees of the first air mix door 51 and the second air mix door 52 by the ECU 90 will be described.

The ECU 90 acquires, from the operation panel 105, the upper level of the vehicle-indoor set temperature Tset, which is set by the temperature-setting switch of the operation panel 105. The ECU 90 sets a target blow-out temperature TAO on the basis of vehicle-indoor set temperature Tset, outside-air temperature Tam detected by the outside-air temperature sensor 102, inside-air temperature Tr detected by the inside-air temperature sensor 103, and an amount of insolation Ts detected by the solar sensor 104. The target blow-out temperature TAO indicates an index value for the temperature at which air is blown into the vehicle interior. On the basis of calculated target blow-out temperature TAO, evaporator temperature Te detected by the evaporator temperature sensor 100, and heater core temperature Th detected by the water temperature sensor 101, the ECU 90 sets a displacement degree Dr of the rack gear 73 using the expression (f) given below.

$$Dr = \{(TAO-Te)/(Th-Te)\} \times 100 (\%) \quad (f)$$

When the displacement degree Dr of the rack gear 73 is 0%, the rack gear 73 is located in the position illustrated in FIG. 3. That is, each of the opening degrees of the first air mix door 51 and the second air mix door 52 is fully closed (MAXCOOL). When the displacement degree Dr is 100%, the rack gear 73 is located in the position illustrated in FIG. 5B. That is, the opening degree of each of the first air mix door 51 and the second air mix door 52 is fully open (MAXHOT).

In the expression (f), the displacement degree Dr may become a negative value or a value exceeding 100% depending on the values of target blow-out temperature TAO, evaporator temperature Te, and heater core temperature Th. Therefore, the ECU 90 sets the displacement degree Dr to 0% when displacement degree Dr is within the range Dr<0 [%], and sets the displacement degree Dr to 100% when the displacement degree Dr is within the range Dr>100 [%].

The ECU 90 drives the motor 75 on the basis of the displacement degree Dr of the rack gear 73. Specifically, a map, which shows the relation between the displacement degree Dr of the rack gear 73 and a rotation angle of the output shaft 75a of the motor 75, is stored in the nonvolatile memory 91 of the ECU 90 in advance. The ECU 90 calculates the rotation angle of the output shaft 75a of the motor 75 from the displacement degree Dr of the rack gear 73 based on the map stored in the nonvolatile memory 91, and drives the motor 75 on the basis of the result of the calculation.

Next, operation of the actuator 70 in the present embodiment will be described.

As shown in FIG. 3 through FIG. 5, an outside diameter of the first gear 71 in a portion engaging with the rack gear 73 decreases as the first air mix door 51 located at the opening degree setting the fully closed condition moves in a direction that an opening degree of the first air mix door 51 increases. In contrast, the outside diameter of the first gear 71 in the portion engaging with the rack gear 73 increases as the first air mix door 51 located at the opening degree setting the fully open condition moves in a direction that an opening degree of the first air mix door 51 decreases.

On the other hand, an outside diameter of the second gear 72 in the portion engaging with the rack gear 73 increases as the second air mix door 52 located at the opening degree setting the fully closed condition moves in a direction that an opening degree of the second air mix door 52 increases. In contrast, the outside diameter of the second gear 72 in the portion engaging with the rack gear 73 decreases as the second air mix door 52 located at the opening degree setting the fully open condition moves in a direction that an opening degree of the second air mix door 52 decreases.

A difference occurs between the rotation aspect of the first gear 71 and the rotation aspect of the second gear 72 due to a difference between the engagement position of the rack gear 73 to the first gear 71 and the engagement position of the rack gear 73 to the second gear 72,. Specifically, as illustrated in FIG. 3, the second gear 72 is larger than the first gear 71 in terms of a rotational displacement degree with respect to the displacement degree Dr of the rack gear 73, when the long-diameter-portion of the first gear 71 is engaged with the rack gear 73, and when the short-diameter portion of the second gear 72 is engaged with the rack gear 73. In contrast, the first gear 71 is larger than the second gear 72 in terms of the rotational displacement degree with respect to the displacement degree Dr of the rack gear 73, when the short-diameter-portion of the first gear 71 is engaged with the rack gear 73, and when the long-diameter portion of the second gear 72 is engaged with the rack gear as illustrated in FIG. 5B. Therefore, the opening degrees Da1, Da2 of the first air mix door 51 and the second air mix door 52 change with respect to the displacement degree Dr of the rack gear 73, respectively as indicated by the solid line and the alternate long and short dashed line in FIG. 6.

Figure 6:
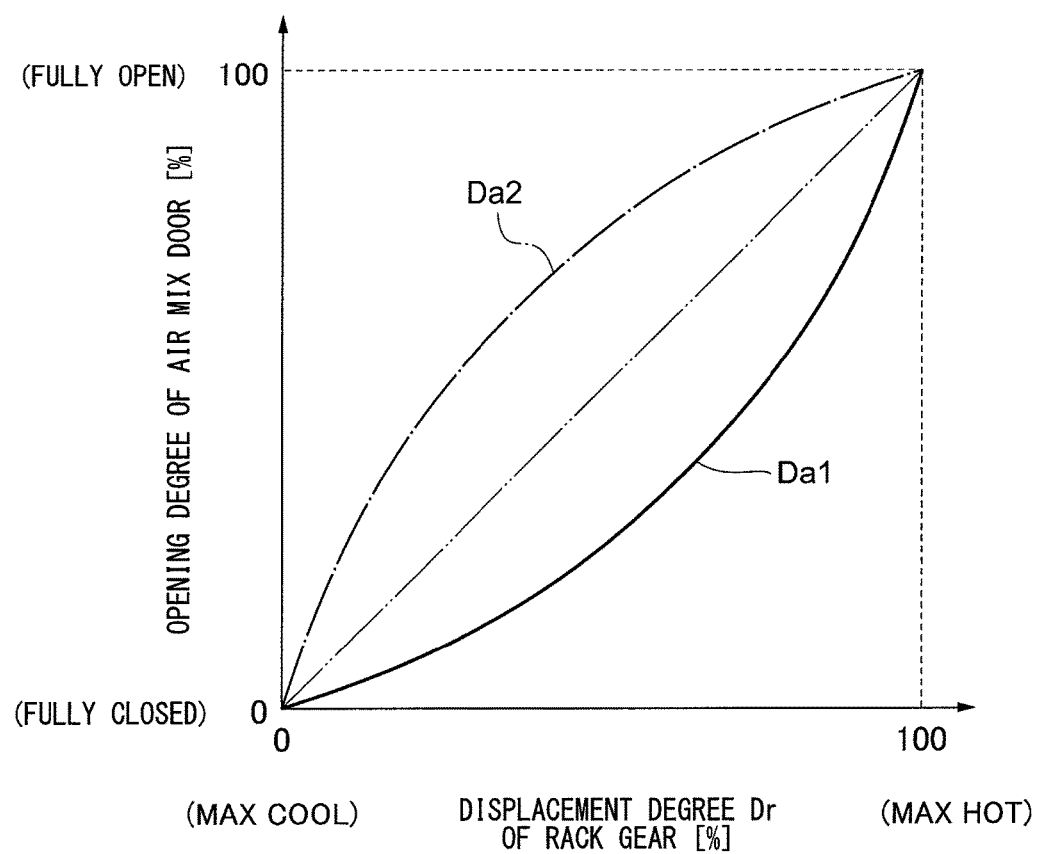
FIG. 6 is a graph illustrating a relation between a displacement degree of a rack gear and an opening degree of the first air mix door and a relation between the displacement degree of the rack gear and an opening degree of the second air mix door, according to the embodiment.

In FIG. 6, the opening degrees Da1, Da2 when the first air mix door 51 and the second air mix door 52 are fully closed, are indicated by 0%. In addition, the opening degrees Da1, Da2 when the first air mix door 51 and the second air mix door 52, are fully open, are indicated by 100%. Furthermore, the two-dot chain line indicates the trajectory of change in the opening degrees Da1, Da2, when the opening degrees Da1, Da2 of the first air mix door 51 and the second air mix door 52 have a proportional relation with the displacement degree Dr of the rack gear 73.

As shown by the solid line in FIG. 6, an opening-degree change rate regarding the opening degree Da1 of the first air mix door 51 with respect to the displacement degree Dr of the rack gear 73 is smaller than that in a case where the displacement degree Dr and the opening degree Da1 are in a proportional relation, when the first air mix door 51 located at the opening degree setting the fully closed condition moves in the direction in which the opening degree increases. Moreover, the opening-degree change rate regarding the opening degree Da1 of the first air mix door 51 with respect to the displacement degree Dr of the rack gear 73 becomes larger as the opening degree Da1 of the first air mix door 51 approaches a fully open condition.

As shown by the alternate long and short dashed line in FIG. 6, the opening degree Da2 of the second air mix door 52 with respect to the displacement degree Dr of the rack gear 73 is larger than that in a case where the displacement degree Dr and the opening degree Da2 are in a proportional relation, when the second air mix door 52 located at the opening degree setting the fully closed condition moves in the direction in which the opening degree increases. Moreover, the opening-degree change rate regarding the opening degree Da2 of the second air mix door 52 with respect to the displacement degree of the rack gear 73 becomes smaller as the opening degree Da2 of the second air mix door 52 approaches a fully open condition.

In addition, the opening degrees Da1, Da2 of the first air mix door 51 and the second air mix door 52 are different from each other, when the displacement degree Dr of the rack gear 73 is within the range 0%<Dr<100%, that is, when the first air mix door 51 and the second air mix door 52 are at the opening degrees setting the intermediate condition. In addition, when the displacement degree Dr of the rack gear 73 is 0%, the opening degrees Da1, Da2 of the first air mix door 51 and the second air mix door 52 are 0%. That is, the first air mix door 51 and the second air mix door 52 are fully closed simultaneously. Here, the term "simultaneous" is not limited to a situation where the times at which the first air mix door 51 and the second air mix door 52 are fully closed coincide exactly. The term "simultaneous" also means, for example, a situation where there is a slight difference between the times at which the first air mix door 51 and the second air mix door 52 are fully opened, due to dimensional tolerance, individual difference, or the like.

In addition, when the displacement degree Dr of the rack gear 73 is 100%, the opening degrees Da1, Da2 of the first air mix door 51 and the second air mix door 52 are 100%. That is, the first air mix door 51 and the second air mix door 52 are fully opened simultaneously. The term "simultaneous" here has the same meaning as above.

According to the air conditioning device 1 for a vehicle described above, the following operations and advantageous effects (1) to (3) can be acquired.

(1) As illustrated in FIG. 6, the actuator 70 interlocks opening/closing operations of the first air mix door 51 and the second air mix door 52 such that the opening degrees Da1, Da2 of the first air mix door 51 and the second air mix door 52 are different from each other.

Specifically, the actuator 70 makes the opening-degree change rate regarding opening degree of the second air mix door 52 larger than the opening-degree change rate regarding opening degree of the first air mix door 51 when the actuator 70 operates the first air mix door 51 and the second air mix door 52, which are located at the opening degrees setting the fully closed condition, to move in the directions that increase the opening degrees. Alternatively, the actuator 70 makes the opening-degree change rate regarding opening degree of the first air mix door 51 larger than the opening-degree change rate regarding opening degree of the second air mix door 52 when the actuator 70 operates the first air mix door 51 and the second air mix door 52, which are located at the opening degrees setting the fully open direction, to move in the directions in which the opening degrees decrease.

Figure 7:
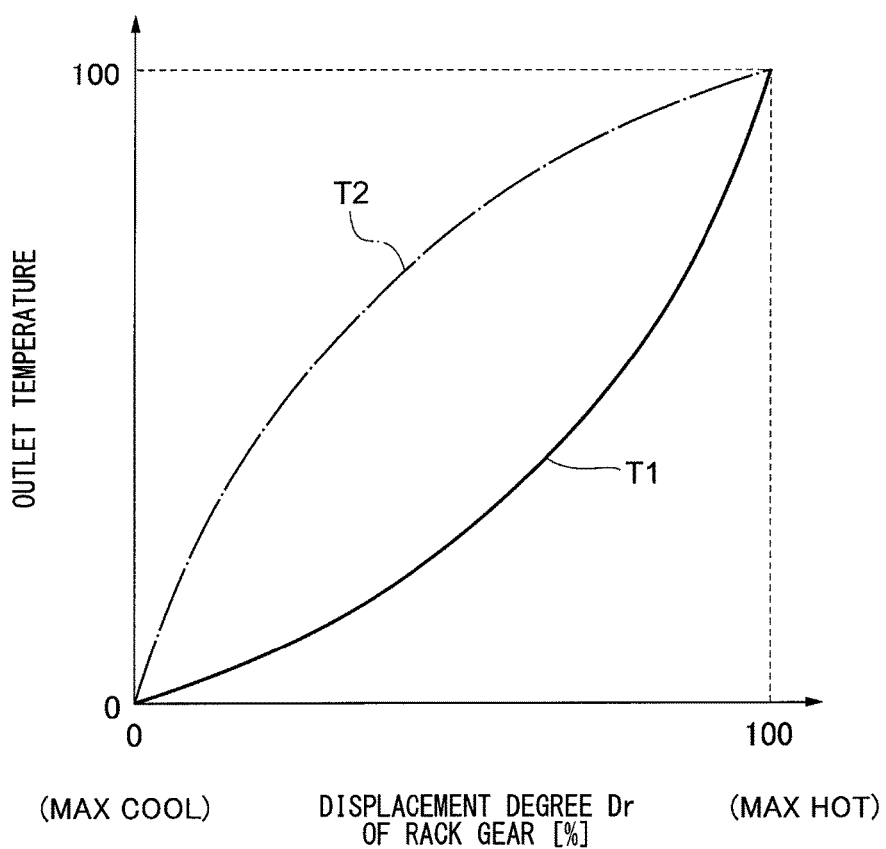
FIG. 7 is a graph illustrating a relation between the displacement degree of the rack gear and an outlet temperature of air blown out from a defroster outlet or a face outlet, and a relation between the displacement degree of the rack gear and an outlet temperature of air blown out from a foot outlet, according to the embodiment.

Accordingly, as illustrated in FIG. 7, a difference arises between an outlet temperature T1 of air blown out from the defroster outlet 14 or the face outlet 15 through the first air passage 11a, and an outlet temperature T2 of air blown out from the foot outlet 16 through the second air passage 11b. Therefore, two-layer flow of inside air and outside air can be achieved such that low-temperature outside air is circulated in the upper layer of the vehicle interior, and high-temperature inside air is circulated in the lower layer of the vehicle interior. As a result, ensuring a dust-proof performance by fresh and low-humidity outside air, keeping an occupant to feel continuously fresh, and improving an efficiency of heating performance by blowing a warm inside air toward the foot of a driver can be obtained simultaneously.

(2) When the first air mix door 51 reaches a fully open condition or a fully closed condition, the second air mix door 52 also reaches a fully open condition or a fully closed condition. Accordingly, the structure can be simplified. This is because of the following reasons.

Figure 8:
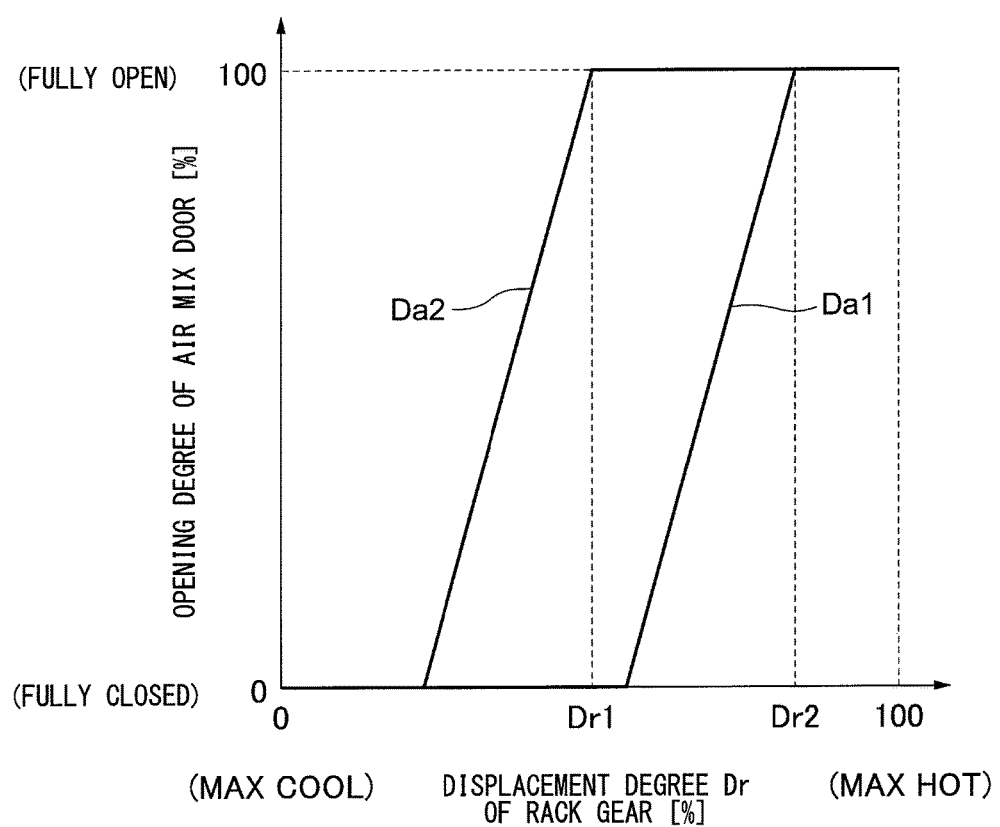
FIG. 8 is a graph illustrating a relation between a displacement degree of a rack gear and an opening degree of a first air mix door and a relation between a displacement degree of the rack gear and an opening degree of a second air mix door, according to a modified example.

For example, a structure as illustrated in FIG. 8 is also conceivable, in which there is a difference between the displacement degree Dr1 of the rack gear 73 when the first air mix door 51 reaches a fully open condition and the displacement degree Dr2 of the rack gear 73 when the second air mix door 52 reaches a fully open condition. However, when the structure is employed, the first air mix door 51 continues to move (i.e., displace) even after reaching a fully open condition, while the displacement degree Dr of the rack gear 73 changes from Dr1 to Dr2. Therefore, a separate structure is required for the first air mix door 51 to escape from displacement after reaching a fully closed condition, that is, to avoid load resulting from movement. The same problem may also occur when the first air mix door 51 and the second air mix door 52 are fully closed.

In this respect, in the air conditioning device 1 for a vehicle according to the present embodiment, the first air mix door 51 and the second air mix door 52 are simultaneously fully opened or closed, thus eliminating the need for a structure for load avoidance, as mentioned above. Accordingly, the structure can be simplified.

(3) The actuator 70 is provided with the guide member 74 that guides movement of the rack gear 73. Accordingly, engagement of the first gear 71 to the rack gear 73 and engagement of the second gear 72 to the rack gear 73 can be held more exactly. Accordingly, the opening/closing operations of the first air mix door 51 and the second air mix door 52 can be interlocked more exactly.

(Other Modifications)

While the present disclosure has been described with reference to preferred embodiments thereof, it is to be understood that the disclosure is not limited to the preferred embodiments and constructions. The present disclosure is intended to cover various modification and equivalent arrangements within a scope of the present disclosure. It should be understood that structures described in the above-described embodiments are preferred structures, and the present disclosure is not limited to have the preferred structures. The present disclosure is intended to cover various modifications and equivalent arrangements within the scope of the present disclosure.

Figure 9:
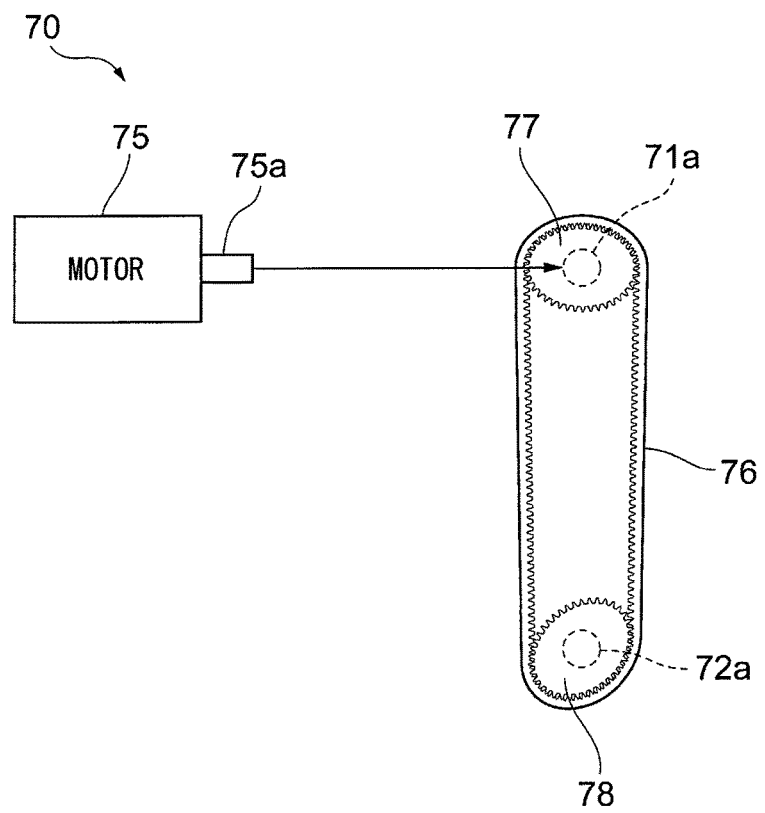
FIG. 9 is a front view illustrating a configuration of an actuator according to a modified example.

(1) In the actuator 70 of the above-described embodiment, the rack gear 73 is used as a coupling member that connects the first gear 71 and the second gear 72. However, an endless belt 76 as illustrated in FIG. 9 may be used. In this case, in place of the first gear 71, an elliptic first pulley 77 with a circular gear portion 71a is used. In addition, in place of the second gear 72, an elliptic second pulley 78 with the circular gear portion 72a is used.

Figure 10:
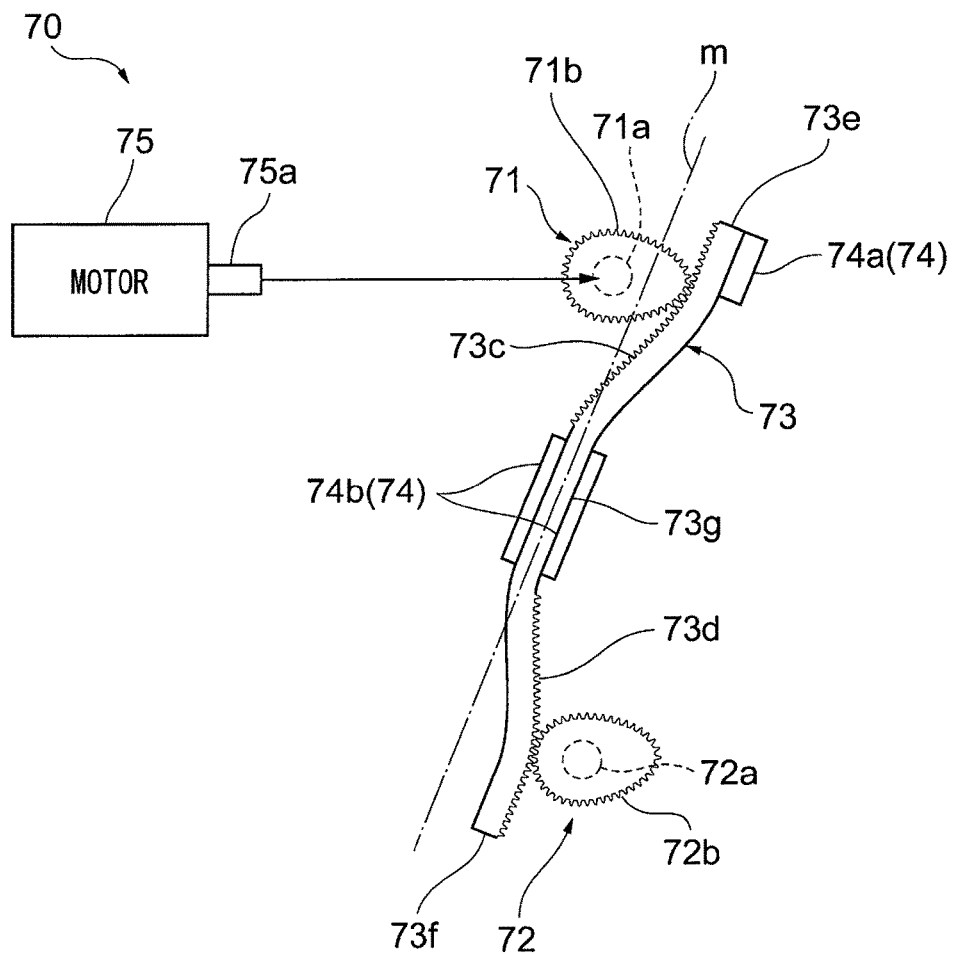
FIG. 10 is a front view illustrating a configuration of an actuator according to a modified example.
Figure 11:
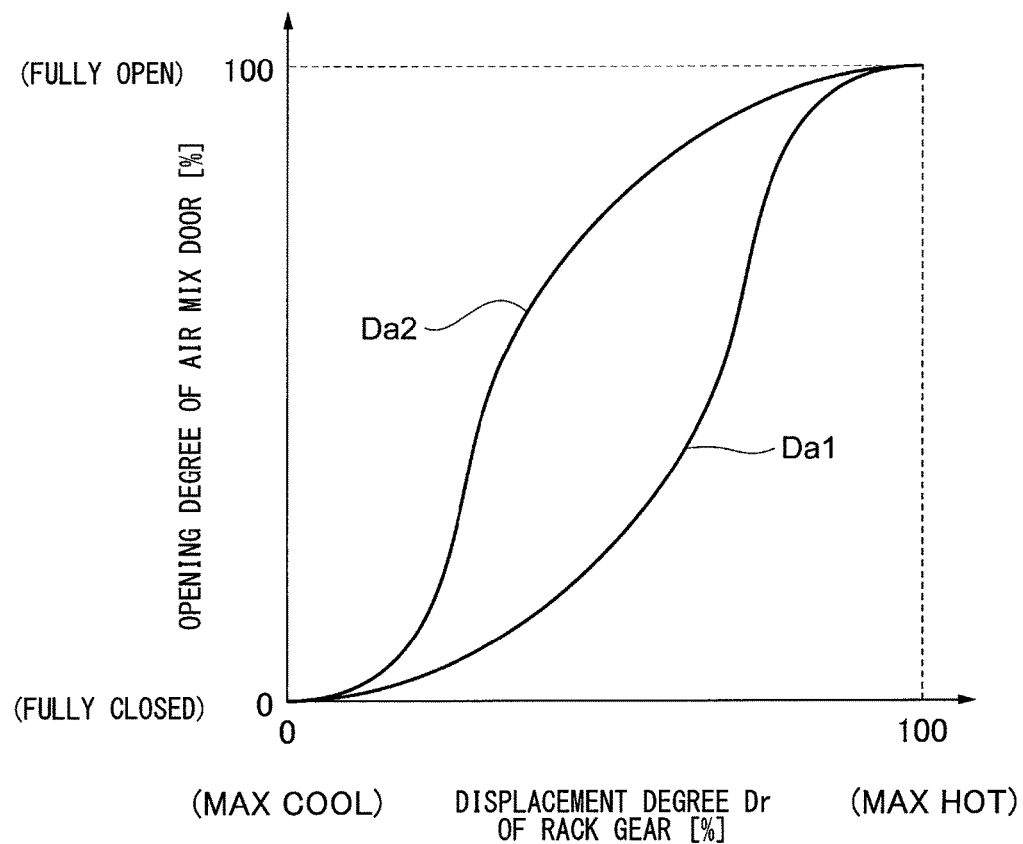
FIG. 11 is a graph illustrating a relation between a displacement degree of a rack gear and an opening degree of a first air mix door and a relation between a displacement degree of the rack gear and an opening degree of a second air mix door, according to the modified embodiment.

(2) An actuator 70 may have, for example, a structure as illustrated in FIG. 10. As illustrated in FIG. 10, in the actuator 70 in the modified example, a first gear 71 and a second gear 72 each have an egg shape. In addition, the first gear surface 73c having a curved shape that can maintain engagement with the first gear 71 is provided on one end portion 73e of the rack gear 73. The second gear surface 73d having a curved shape that can maintain engagement with the second gear 72 is provided on the other end portion 73f of the rack gear 73. A straight portion 73g in parallel with an axial line m is provided in the middle part of the rack gear 73. The guide member 74 has a first guide member 74a and a second guide member 74b. The first guide member 74a is in contact with the one end portion 73e of the rack gear 73. The straight portion 73g is interposed into the second guide member 74b. The first guide member 74a and the second guide members 74b guide the movement of the rack gear 73. Such an actuator 70 can change opening degrees Da1, Da2 of the first air mix door 51 and the second air mix door 52, as illustrated in, for example, FIG. 11. Therefore, it is possible to realize operation and advantageous effects according to the embodiment described above.

Figure 12:
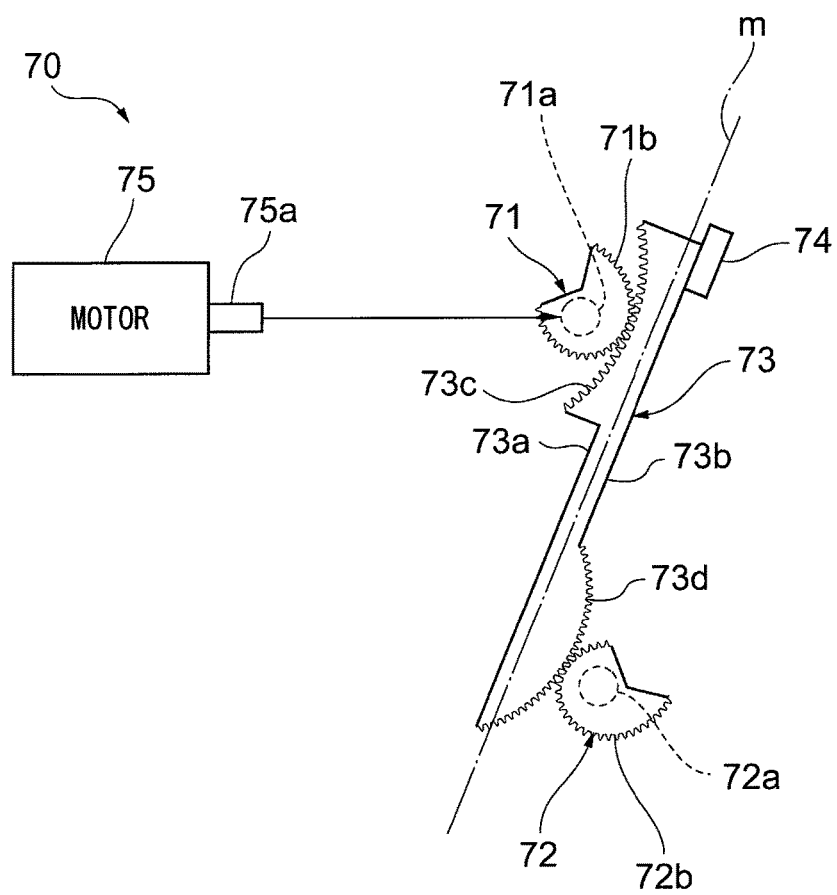
FIG. 12 is a front view illustrating a configuration of an actuator according to a modified example.

(3) The non-circular gear portions 71b, 72b of the first gear 71 and the second gear 72 are not limited to ones that have elliptical shapes. For example, as illustrated in FIG. 12, each of the non-circular gear portions 71b, 72b may have a shape of which outside diameter gradually increases in circumferential direction. In short, any non-circular shapes may suffice as shapes for the non-circular gear portions 71b, 72b. Changing the shapes of the non-circular gear portions 71b, 72b makes it possible to arbitrarily modify aspects of change in the opening degrees Da1, Da2 of the first air mix door 51 and the second air mix door 52 with respect to the displacement degree Dr of the rack gear 73.

(4) The first gear 71 and the second gear 72 are not limited to have the non-circular gear portions 71b, 72b, respectively. For example, the first gear 71 and the second gear 72 may have circular gear portions instead of the non-circular gear portions 71b, 72b, respectively. The circular gear portion of each of the first gear 71 and the second gear 72 has a portion that partially lacks teeth. A rack gear 73 is engaged with each of the circular gear portions of the first gear 71 and the second gear 72. The rack gear 73 has portions engaging with the first gear 71 and the second gear 72 respectively, and the portions respectively have a first gear surface and a second gear surface that extend linearly. According to such a configuration, for example, when the portion of the first gear 71 lacking the teeth engages with the rack gear 73, the rack gear 73 does not move and, therefore, the second gear 72 does not rotate. This makes it possible to prevent change in the opening degree Da2 of the second air mix door 52 during change in the opening degree Da1 of the first air mix door 51. Therefore, the opening degrees Da1, Da2 of the first air mix door 51 and the second air mix door 52 with respect to the displacement degree Dr of the rack gear 73 can be changed as illustrated in, for example, FIG. 8. Even in such a configuration, the operation and advantageous effects described in (1) can be acquired. The same advantageous effects can be acquired even in a case where teeth-lacking portions are provided in the rack gear 73.

Figure 13A:
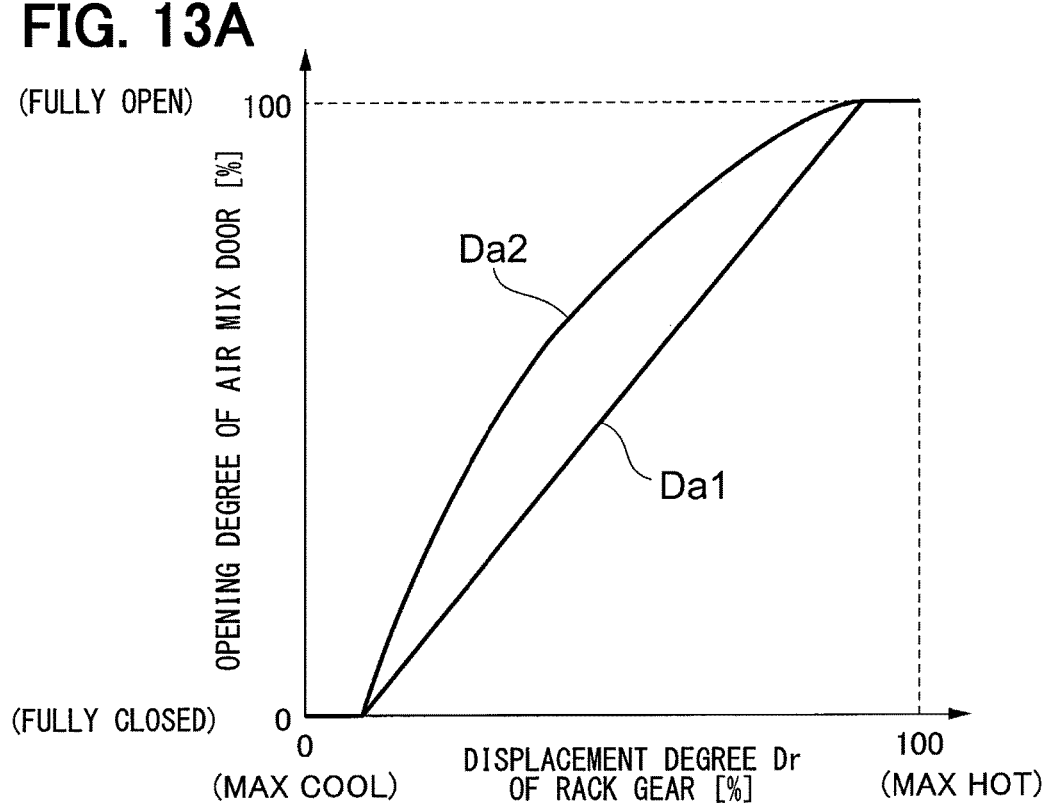
FIG. 13A is a graph illustrating a relation between a displacement degree of a rack gear and an opening degree of a first air mix door and a relation between a displacement degree of the rack gear and an opening degree of a second air mix door, according to a modified embodiment.
Figure 13B:
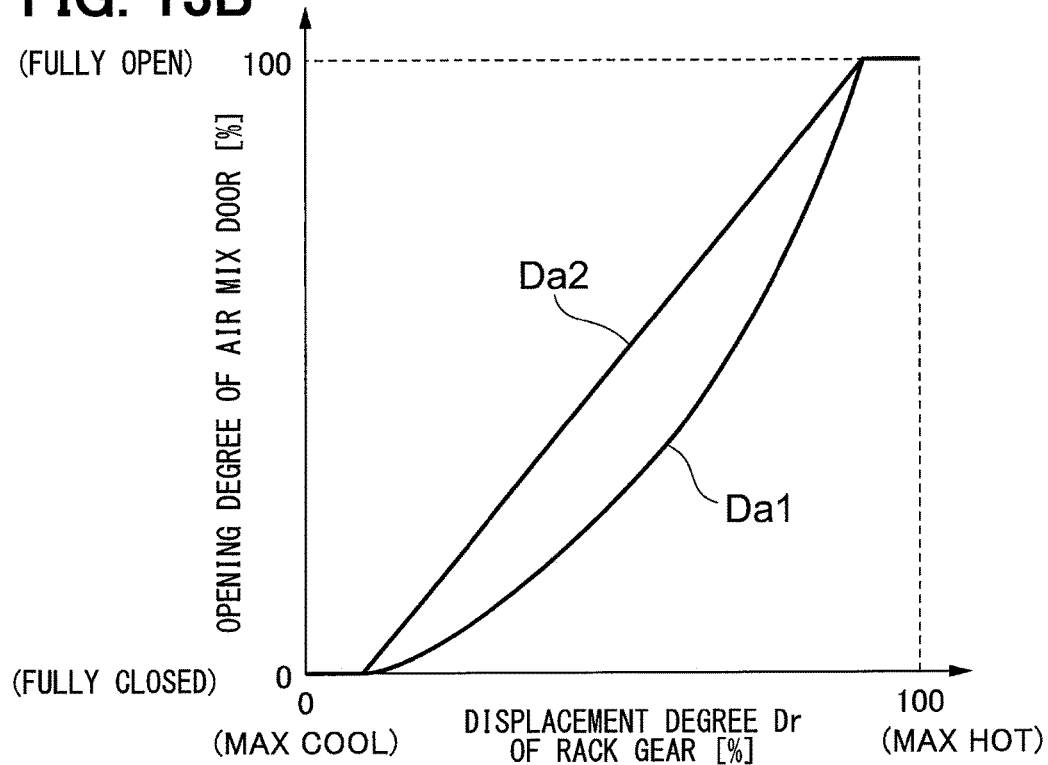
FIG. 13B is a graph illustrating a relation between a displacement degree of a rack gear and an opening degree of a first air mix door and a relation between a displacement degree of the rack gear and an opening degree of a second air mix door, according to a modified embodiment.

(5) The gear shapes of the portions of the first gear 71 and the second gear 72 that engage with the rack gear 73 may be different from each other. For example, the gear shape of either the non-circular gear portions 71b, 72b of the first gear 71 and the second gear 72 may be circular. For example, when the non-circular gear portion 72b of the first gear 71 is circular, the opening degree Da1 of the first air mix door 51 can be changed to have a proportional relation with the displacement degree Dr of the rack gear 73, as illustrated in FIG. 13A. In addition, for example, when the non-circular gear portion 71b of the second gear 72 is circular, the opening degree Da2 of the second air mix door 52 can be changed to have a proportional relation with the displacement degree Dr of the rack gear 73, as illustrated in FIG. 13B. In this way, arbitrarily changing the gear shape of the portion of the first gear 71 to which the rack gear 73 engages, makes it possible to arbitrarily modify change aspect of the opening degree Da1 of the first air mix door 51 with respect to the displacement degree Dr of the rack gear 73. In addition, arbitrarily changing the gear shape of the portion of the second gear 72 to which the rack gear 73 engages, makes it possible to arbitrarily modify change aspect of the opening degree Da2 of the second air mix door 52 with respect to the displacement degree Dr of the rack gear 73. In short, it is enough for the actuator 70 to interlock the opening/closing operations of the first air mix door 51 and the second air mix door 52 such that the opening degrees Da1, Da2 of the first air mix door 51 and the second air mix door 52 are different from each other.

(6) The first air mix door 51 is not limited to one that performs an opening/closing operation by sliding, but may be one that performs an opening/closing operation, for example, by rotating integrally with the first gear 71. This is the same for the second air mix door 52.

(7) The actuator 70 is not limited to one that opens or closes the first air mix door 51 and the second air mix door 52 by transmitting power from the motor 75 to the first gear 71. For example, the first air mix door 51 and the second air mix door 52 may be opened or closed by rotating the second gear 72 by means of the motor 75. For example, the first air mix door 51 and the second air mix door 52 may be opened or closed by moving the rack gear 73 in the direction of the axial line m by means of the motor 75.

(8) The position of engagement of the first gear 71 to the rack gear 73 can be changed arbitrarily. The position of engagement of the second gear 72 to the rack gear 73 can also be changed arbitrarily.

(9) The actuator 70 is not limited to one that uses the motor 75 as power source. For example, the temperature-setting switch of the operation panel 105 and the rack gear 73 may be mechanically connected by a wire. The first air mix door 51 and the second air mix door 52 may be opened or closed by moving the rack gear 73 along the axial line m on the basis of operation of the temperature-setting switch, performed by an occupant. That is, the opening/closing operations of the first air mix door 51 and the second air mix door 52 may be performed on the basis of human power.

The present disclosure is not limited to the above-described specific examples. That is, modifications that are made by a person having ordinary skill in the art, as required, based on the specific examples are included in a range of the present disclosure as long as having the features of the present embodiment. For example, elements mentioned in the specific examples, an arrangement, a material, a condition, a shape, a size, etc. of the elements are not limited to above-described examples, and can be changed suitably. Elements mentioned in the specific examples can be combined as long as it is technically possible, and the combination is included in the range of the present disclosure as long as having the features of the present embodiment.

What is claimed is:

1. An air conditioning device for a vehicle comprising:
   an air-conditioning case that therein has a first air passage and a second air passage;
   a heater core that heats air flowing through each of the first air passage and the second air passage;
   a first air mix door that is arranged in the first air passage and adjusts a ratio between a flow rate of air passing through the heater core and a flow rate of air bypassing the heater core by an opening/closing operation;
   a second air mix door that is arranged in the second air passage and adjusts a ratio between a flow rate of air passing through the heater core and a flow rate of air bypassing the heater core in the second air passage by an opening/closing operation; and
   an actuator that interlocks the opening/closing operations of the first air mix door and the second air mix door such that opening degrees of the first air mix door and the second air mix door are different from each other, wherein
   the actuator has:
      a first rotation member that opens or closes the first air mix door by a rotating operation;
      a second rotation member that opens or closes the second air mix door by a rotating operation;
      a coupling member that couples the first rotation member and the second rotation member with each other; and
      a motor that transmits power to the first rotation member, the second rotation member, or the coupling member,
   the first rotation member is a first gear,
   the second rotation member is a second gear,
   the coupling member is a rack gear that is engaged with both the first gear and the second gear,
   each of the first gear and the second gear has a non-circular gear portion,
   the rack gear has
      a first gear surface that has a curved shape and is engaged with the non-circular gear portion of the first gear and
      a second gear surface that has a curved shape and is engaged with the non-circular gear portion of the second gear, and
   an engagement position in which the first gear is engaged with the first gear surface is different from an engagement position in which the second gear is engaged with the second gear surface.

2. The air conditioning device for a vehicle according to claim 1, wherein
   when a fully closed condition is defined as a condition in which the first air mix door and the second air mix door are at an opening degree that maximizes the flow rate of the air bypassing the heater core,
   the first gear is engaged with the rack gear such that an outside diameter of a portion engaged with the rack gear decreases as the first air mix door located at the opening degree setting the fully closed condition moves in a direction that the flow rate of the air passing through the heater core increases, and
   the second gear is engaged with the rack gear such that an outside diameter of a portion engaged with the rack gear increases as the second air mix door located at the opening degree setting the fully closed condition moves in a direction that the flow rate of the air passing through the heater core increases.

3. The air conditioning device for a vehicle according to claim 1, wherein when a fully open condition is defined as a condition in which the first air mix door and the second air mix door are at an opening degree that maximizes the flow rate of the air passing through the heater core, the first gear is engaged with the rack gear such that an outside diameter of a portion engaged with the rack gear increases as the first air mix door located at the opening degree setting the fully open condition moves in a direction that the flow rate of the air bypassing the heater core increases, and the second gear is engaged with the rack gear such that an outside diameter of a portion engaged with the rack gear decreases as the first air mix door located at the opening degree setting the fully open condition moves in a direction that the flow rate of the air bypassing the heater core increases.

4. The air conditioning device for a vehicle according to claim 1, wherein the actuator further has a guide member that guides the rack gear such that a state in which the first gear and the second gear are engaged is held when the rack gear is moved.

* * * * *